United States Patent [19]
Ogawa et al.

[11] Patent Number: 5,256,741
[45] Date of Patent: Oct. 26, 1993

[54] METHOD FOR THE MANUFACTURE OF BRANCHED POLYSILOXANE

[75] Inventors: Takuya Ogawa; Toshio Suzuki, both of Kanagawa, Japan

[73] Assignee: Dow Corning Japan, Ltd., Tokyo, Japan

[21] Appl. No.: 19,406

[22] Filed: Feb. 18, 1993

[30] Foreign Application Priority Data

Feb. 26, 1992 [JP] Japan .................................. 4-039568

[51] Int. Cl.$^5$ ............................................. C08F 283/00
[52] U.S. Cl. ...................................... 525/477; 528/33; 528/34; 528/39
[58] Field of Search ............................ 528/33, 34, 39; 525/477

[56] References Cited

FOREIGN PATENT DOCUMENTS 914738 10/1991 Japan .
914739 10/1991 Japan .

OTHER PUBLICATIONS

W. H. Dickstein et al, Macromolecules, 22, 3886-3888 (1989).
H. Huang et al, Polymer Bulletin, 14, 557-564 (1985).

Primary Examiner—Melvyn I. Marquis
Attorney, Agent, or Firm—William F. Boley

[57] ABSTRACT

The present invention is a novel method for the manufacture of branched polysiloxanes having the polysiloxane $SiO_{4/2}$ unit as the branch center precisely bonded to one end of a diorganopolysiloxane. The present invention concerns a method for the manufacture of a branched polysiloxane characterized by reacting alinear polysiloxane with a reactive polysiloxane having halogen substitution.

15 Claims, No Drawings

METHOD FOR THE MANUFACTURE OF BRANCHED POLYSILOXANE

BACKGROUND OF INVENTION

The present invention concerns a method for the manufacture of novel branched polysiloxanes, more specifically a method for the manufacture of branched polysiloxanes comprised of the polysiloxane unit $SiO_{4/2}$ as the branch center and a diorganopolysiloxane units as the branch.

Numerous proposals have been made for polysiloxanes having branches inside the molecules and they have been commerically available. For example, in W.H. Dickstein et al., Macromolecules, 22, 3886-3888 (1989), is reported the synthesis of branched polydimethylsiloxanes with 4 amino- group-terminated polydimethylsiloxy groups with controlled molecular weight. However, there have not been any reports of organopolysiloxanes having the polysiloxane unit $SiO_{4/2}$ as the branch center.

Most of the known branched organopolysiloxanes are simple mixtures or reaction products of a $SiO_{4/2}$ component and a diorganopolysiloxane component, and the structures are not clear. For example, H. Huang et al.: Polymer Bulletin, 14, 557-564 (1985) reported polymers obtained by reacting hydroxy-terminated dimethylpolysiloxane and tetraethyl orthosilicate by a sol-gel method. In this polymerization product, either ends of the diorganopolysiloxane can be bonded to the branch center, and the structure is not clear. There have not been any reports of so-called star-type organopolysiloxanes having polysiloxane a $SiO_2$ unit as the branch center bonded to one end of diorganopolysiloxane components. We have proposed novel branched polysiloxanes and a method for their manufacture (Japanese Patent Application Nos. Hei 3{1991}-286745, Hei 3{1991}-286753).

As described above, the present invention provides a novel method for the manufacture of branched polysiloxanes with clear structure. These compounds are useful as starting materials for silicone elastomers or reinforcing agents. They are also useful as additives for improving flow characteristics of silicone fluids.

SUMMARY OF INVENTION

The present invention is a novel method for the manufacture of branched polysiloxanes having the polysiloxane $SiO_{4/2}$ unit as the branch center precisely bonded to one end of a diorganopolysiloxane. The present invention concerns a method for the manufacture of a branched polysiloxane characterized by reacting a linear polysiloxane with a reactive polysiloxane having halogen substitution.

DESCRIPTION OF INVENTION

The present invention is a novel method for the manufacture of branched polysiloxanes having the plysiloxane unit $SiO_{4/2}$ as the branch center precisely bonded to one end of a diorganopolysiloxane. The present invention comprises a method for the manufacture of a branched polysiloxane described by formula (III), the method characterized by reacting a linear polysiloxane described by formula (I) with a reactive polysiloxane described by formula (II).

The linear polysiloxanes useful in the present process are described by formula $$R^1(R^2R^3SiO)_aM, \quad (I)$$

where each $R^1$, $R^2$, and $R^3$ is independently selected from a group consisting of hydrogen atom, alkyls comprising one to eight carbon atoms, haloalkyls comprising one to eight carbon atoms, alkenyls comprising two to eight carbon atoms, and aryls; $1 \leq a \leq 1000$; and M is selected from a group consisting of hydrogen atom and alkali metal atoms.

The reactive polysiloxanes useful in the present process are described by formula $$(SiO_{4/2})_x(R^4{}_2QSiO_{1/2})_y(R^5{}_2R^6SiO_{1/2})_w, \quad (II)$$

where R is selected from a group consisting of hydrogen atom and alkyls comprising one to eight carbon atoms; each $R^4$ and $R^5$ is independently selected from a group consisting of alkyls comprising one to eight carbon atoms, haloalkyls comprising one to eight carbon atoms, alkenyls comprising two to eight carbon atoms, and aryls; $R^6$ is selected from a group consisting of hydrogen atom, alkyls comprising one to eight carbon atoms, haloalkyls comprising one to eight carbon atoms, alkenyls comprising two to eight carbon atoms, and aryls; Q is a halogen atom; $2 \leq x \leq 500$, $2 \leq y + z + w \leq 150$; $2 \leq y$; $0 \leq z$; $0 \leq w \leq 15$; $0.3 \leq (y+z+w)/x \leq 3$; $0 \leq w/(y+z+w) \leq 0.1$).

Branched polysiloxanes which can be prepared by the present method are described by formula $$(SiO_{4/2})_x(R^4{}_2ASiO_{1/2})_y(R^5{}_2R^6SiO_{1/2})_z(RO_{1/2})_w, \quad (III)$$

where A is described by the formula $(OSiR^2R^3)_aR^1$, $R^1, R^2$, and $R^3$ are as previously described; $1 \leq a \leq 1000$; and all other values and substituents are as previously described.

In the linear polysiloxanes, formula (I), used in the present invention, the substituents $R^1$, $R^2$, and $R^3$ alkyl groups such as methyl group, ethyl group, propyl group, butyl group; haloalkyl groups such as 3,3,3-trifluoropropyl group, etc; alkenyl groups such as vinyl groups, allyl group, butenyl group, etc.; aryl groups such as phenyl group, etc. $R^1$, $R^2$, and $R^3$ may be the same or different.

The degree of polymerization of the linear polysiloxanes a is 1-1000. The a value determines the length of the branches in the branched polysiloxanes. When the value a exceeds 1000, the overall molecular weight of the polysiloxane becomes too big, with very high viscosity. A practical preferred range of a is 1-800, more preferably 1-500.

The ends of the linear polysiloxane molecules are silanol or silanol metal salts. In the case of silanol metal salts, the alkali metal atom M may be lithium, sodium, potassium, cesium, etc., while lithium is preferred.

While there are no restrictions on the methods for the manufacture of the linear polysiloxanes used in the present invention, the following method is recommended for polysiloxanes of uniform degree of polymerization, namely, a ring-opening polymerization of cyclic polysiloxanes in the presence of alkali metal compounds. While any cyclic polysiloxanes having the substituents $R^2$ and $R^3$ can be used, more preferred in terms of reactivity are cyclotrisiloxane, cyclotetrasiloxane, cyclopentasiloxane, cyclohexasiloxane, etc. These compounds may be use singly or as mixtures thereof. Such cyclic polysiloxanes are reacted with alkali metal compounds in the presence or absence of organic solvents for the ring-opening polymerization to botain linear polysiloxanes.

While not restricted in any particular way, organic solvents with a certain polarity are preferred for good solubility of the cyclic polysiloxanes, product linear polysiloxanes and also final-product branched polysiloxanes. In some case, good results are obtained when mixtures of polar and nonpolar solvents are used. Suitable solvents are aliphatic hydrocarbons such as hexane, heptane, octane, etc.; aromatic hydrocarbons such as benzene, toluene, xylene, etc; ether compounds such as diethyl ether, dibutyl ether, diphenyl ether, tetrahydrofuran, 1,4-dioxane, etc.; chlorine compounds such as carbon tetrachloride, chloroform, trichloroethane, etc. However, suitable solvents are not limited to the examples given above.

The alkali metal compounds that can be used are alkyl, aryl, and amide compounds of alkali metal such as lithium, sodium, potassium, cesium, etc. Preferred are readily available alkali metal methyl, ethyl, propyl, butyl, phenyl compounds, etc., while butyllithium is especially preferred.

The reactive polysiloxanes, formula (II), can be prepared, e.g., by reacting hydrogen-functional polysiloxanes described by formula

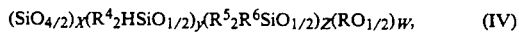

$$(SiO_{4/2})_x(R^4{}_2HSiO_{1/2})_y(R^5{}_2R^6SiO_{1/2})_z(RO_{1/2})_w, \quad (IV)$$

where R, $R^4$, $R^5$, $R^6$, x, y, z, and w are as defined for the branched polysiloxane, formula (III), with halogen compounds such as carbon tetrachloride under energy-beam irradiation or in the presence of metal chlorides or radical initiators.

Such reactive polysiloxanes are than reacted with linear polysiloxanes at room temperature, under cooling, or under heating, usually at $-80°$ C. to 200° C., while a more proper temperature range is from $-25°$ C. tp 160° C.

In the case of linear polysiloxanes with silanol terminal groups, this reaction is performed preferably in the presence of a hydrogen halide trapping agent. While not restricted in any particular way, the hydrogen halide trapping agents that can be used are organic bases such as triethylamine, pyridine, etc., and inorganic bases such as ammonia, etc.

The branched polysiloxanes thus obtained contain x $SiO_{4/2}$ units in a molecule, and this part becomes the siloxane center, namely the nucleus. The value of x is above one, especially above 4, without any restrictions in the upper limit. However, in general, when x exceeds 500, the resulting branched polysiloxanes have very poor solubility in organic solvents, thus handling becomes very difficult. Considering workability, x should be below 300, more preferably below 150.

The number of the $(^4{}_2ASiO_{1/2})$ units, an important part of the branched polysiloxanes of the present invention, is y in a molecule. There are not any special restrictions on y, as long as it is 2 or more, while a value of 3 or more for y is preferred in terms of branching. The upper limit of y is 150. Making polymers of higher y values is difficult.

The $(R^5{}_2R^6SiO_{1/2})$ unit is not essential in the branched polysiloxanes of the present invention, thus the z value may be zero. This unit controls the number of branches and size of nucleus in the branched polysiloxanes of the present invention. Namely, the (y+z+w)/x value determines the size of the nucleus; the nucleus size increases with decreasing (y+z+w)/x value. At the same nucleus size, the number of branches increases with decreasing z value. There is an upper limit on the z value, since synthesizing molecules with a (y+z+w)/x value. At the same nucleus size, the number of branches increases with decreasing z value. There is an upper limit on the z value, since synthesizing molecules with a (y+z+w) value above 150 is very difficult.

Depending on the conditions for the synthesis of the hydrogren-functional polysiloxanes, formula (IV), for the starting materials used in the polysiloxane reaction preparation, there may be residual $(RO_{1/2})$ units, which should be less than 15 in a molecule. The content of these based on the sum of all the units except $(SiO_{4/2})$ should be less than 10 mol%.

The monofunctional unit to tetrafunctional unit ratio (y+z+w)/x is from 0.3 to 3. With decreasing (y+z+w)/x value, the polysiloxane molecular weight increases; however, it is not favorable for this value to be below 0.3, because a marked decrease in the polysiloxane solubility in organic solvents occurs. On the other hand, if this value exceeds 3, it is also not favorable because the molecular weight is too small. The most suitable range is 0.3 to 2.

Each of the substituents $R^4$ and $R^5$ may be independently selected from a group consisting of alkyls comprising one to eight carbon atoms, haloalkyls comprising one to eight carbon atoms, alkenyls comprising two to eight carbon atoms, and aryls. For terms of ecomony it is preferred that each $R^4$ and $R^5$ be independently selected from a group consisting of methyl, vinyl, and phenyl.

The substituent A corresponds to diorganopolysiloxanes described by formula $(OSiR^2R^3)_aR^1$, namely, the linear polysiloxane minus the alkali metal or hydrogen atom M.

The present invention is further explained with the following examples. However, the present invention is not limited to such examples.

EXAMPLE 1

(Not within the scope of the present invention.)

Preparation of reactive polysiloxane of formula $(SiO_{4/2})_{22}(Me_2ClSiO_{1/2})_{20}$ in 100 mL of carbon tetrachloride was treated with 3.0 g of benzoyl peroxide. The resulting mixture was then heated under reflux for 40 h and freed from the solvent by distillation. The residue was treated with n- hexane, filtered from the insolubles and freed from the n- hexane by distillation to obtain 25 g (yield 99%) of a polymer corresponding to $(SiO_{4/2})_{22}(Me_2ClSiO_{1/2})$

Example 2

(Not within the scope of the present invention.)

Preparation of reactive polysiloxane of formula $(SiO_{4/2})_{22}(Me_2ClSiO_{1/2})_{16}(Me_3SiO_{1/2})_4$. A solution of 20 g of hydrogen-functional polysiloxane represented by $(SiO_{4/2})_{22}(Me_2ClSiO_{1/2})_{16}(Me_3SiO_{1/2})_4$. A solution of 20 g of hydrogen-functional polysiloxane represented by $(SiO_{4/2})_{22}(Me_2HSiO_{1/2})_{16}(Me_3SiO_{1/2})_4$ in 100 mL of carbon tetrachloride was treated with 2.3 g of palladium chloride; the resulting mixture was then heated under reflux for 40 h and filtered from the palladium chloride to botain 23.8 (yield 99%) of a polymer corresponding to $(SiO_{4/2})_{22}(Me_2ClSiO_{1/2})$ $Me_3SiO_{1/2})_4$.

Example 3

A solution of 8.6 g of 1,3,5,7-tetramethyl- 1,3,5,7-tetravinylcyclotetrasiloxane in 150 mL of tetrahydrofuran in an ice bath at 0° C. was treated with 59 mL of 1.69 mol n-butyllithium solution in hexane over a period of 30 min; this was then treated with a hexamethylcyclotrisiloxane solution in tetrahydrofuran (corresponding to 133 g hexamethylcyclotrisiloxane), and stirred continuously, while the hexamethylcyclotrisiloxane consumption was traced by gas chromatography until the conversion reached above 95%. The reaction mixture was then treated with 16.7 g of the reactive polysiloxane from Example 1 and stirred further for 1 h. The solid formed was filtered out, washed with water and dried to obtain 136 g (yield 85%) of a polymer corresponding to $(SiO_{4/2})_{22}(Me_2ASiO_{1/2})_{20}$ (where A represents $(OSiME_2)_{180}SiMenVuVi$; Me=methyl, nBu=n-butyl, Vi=vinyl). Gel permeation chromatography revealed a number- average molecular weight of 20,700 and dispersivity of 1.6. Other analysis revealed: IR: 1091, 1024 cm$^{-1}$ (Si-O-Si); $^1$H— NMR (CDCl$_3$ solvent, CHCl$_3$ standard, $\beta$=7.24 ppm): 0–0.1 (s, 105H), 0.6 (t, 2H), 0.9 (t, 3H), 1.3 (m, 4H), 5.7–5.8 (q, 1H), 5.9–6.0 (q, 1H), 6.0–6.1 (q, 1H); $^{29}$Si-NMR (CDCl$_3$ solvent, TMS standard, $\delta$=0 ppm); −4.0 (SiViMenBu), −21 to −22.5 (SiMe$_2$), and −110.9 (SiO$_{4/2}$).

Example 4

Example 3 was repeated using 20.3 g of the reactive polysiloxane prepared in Example 2 to obtain 143 g (yield 87%) of a polymer corresponding to $(SiO_{4/2})_{22}$-$(Me_2ASiO_{1/2})_{16}(Me_3SiO_{1/2})$ (where A=(OSiMe$_2$)$_{18}$-oSiMenBuVi) with an average molecular weight of 14,500.

Example 5

Example 3 was repeated using 187 g of 1,3,5-trimethyl-1,3,5-tris(3,3,3-trifluoropropyl)cyclotrisiloxane in place of the hexamethylcyclotrisiloxane solution in tetrahydrofuran to obtain $(SiO_{4/222})(Me_2ASIO_{1/2})_{20}$(-where A=(OSiMeC$_2$H$_4$CF$_3$)$_{120}$SiMenBuVi) at a yield of 88% with an average molecular weight of 12,500. Analysis showed: IR:1071, 1020 cm$^{-1}$ (Si-O-Si); $^1$H-NMR (CD$_3$COCD$_3$ solvent, CH$_3$COCH$_3$ standard, $\beta$=2.04 ppm): 0.1–0.3 (m, 45H), 0.6 (t, 2H), 0.8–0.9 (m, 27H), 1.3 (m, 4H), 2.1–2.3 (m, 24H), 5.7–5.8 (q, 1H), 5.9–6.0 (g, 1H), and 0.6–6.1 (q, 1H); $^{29}$Si-NMR (CD$_3$COCD$_3$ solvent, TMS standard, $\beta$=0 ppm): −2.2 (SiViMenBu), −20.0 (SiMe$_2$), −22.1 (SiC$_2$H$_4$CF$_3$), and −110.9 (SiO$_{4/2}$).

Example 6

Example 3 was repeated using a hexaphenylcyclotrisiloxane solution in diphenyl ether, that is 119 a hexaphenylcyclotrisiloxane in place of the hexamethylcyclotrisiloxane solution in tetrahydrofuran. The method was conducted at a reaction temperature of 160° C. and a reaction time of 15 h to botain $(SiO_{4/2})_{22}(Me_2ASiO_{1/2})_{20}$ (where A=(OSiPh$_2$)$_{60}$ SiMenBuVi and Ph=phenyl) at a yield of 58% with an average molecular weight of 15,000.

I claim:

1. A method for the manufacture of a branched polysiloxane described by formula $(SiO_{4/2})x(R^4{}_2ASiO_{1/2})y(R^5{}_2R^6SiO_{12})z(RO_{1/2})w$;

the method comprising: reacting a linear polysiloxane described by formula $R^1(R^2R^3SiO)_aM$ with a reactive polysiloxane described by formula $(SiO_{4/2})x(R^4{}_2QSiO_{1/2})y(R^5{}_2R^6SiO_{1/2})z(RO_{1/2})w$;

where R is selected from a group consisting of hydrogen atom and alkyls comprising one to eight carbon atoms; each R$^1$, R$^2$, R$^3$, and R$^6$ is independently selected from a group consisting of hydrogen atom, alkyls comprising one to eight carbon atoms, haloalkyls comprising one to eight carbon atoms, alkenyls comprising two to eight carbon atoms, and aryls; each R$^4$ and R$^5$ is independently selected from a group consisting of alkyls comprising one to eight carbon atoms, haloalkyls comprising one to eight carbon atoms, alkenyls comprising two to eight carbon atoms, and aryls; Q is a halogen; M is selected from a group consisting of hydrogren atoms and alkali metals; A is described by formula $(OSiR^2R^3)_aR^1$, where R$^1$, R$^2$, and R$^3$ are as previously described and $1 \leq a \leq 1000$; $2 \leq x \leq 500$; $2 \leq y+z+w \leq 150$; $2 \leq y$; $0 \leq z$; $0 \leq w \leq 15$; $0.3 \leq (y+z+w)/x \leq 3$; and $0 \leq w/(y+z+w) \leq 0.1$).

2. A method for the manufacture of the branched polysiloxane of claim 1, where M is lithium.

3. A method for the manufacture of the branched polysiloxane of claim 1, where Q is chlorine.

4. A method for the manufacture of the branched polysiloxane of claim 1, where $1 \leq a \leq 500$.

5. A method for the manufacture of the branched polysiloxane of claim 1 further comprising an organic solvent.

6. A method for the manufacutre of the branched polysiloxane of claim 1, where the method is run at a temperature within a range from −25° C. to 160° C.

7. A method for the manufacture of the branched polysiloxane of claim 1, where M is a hydrogen atom and the method is conducted in the presence of a hydrogen halide trapping agent.

8. A method for the manufacture of the branched polysiloxane of claim 7, where the hydrogen halide trapping agent is selected from a group consisting of organic bases and inorganic bases.

9. A method for the manufacture of the branched polysiloxane of claim 1, where $4 \leq x \leq 150$.

10. A method for the manufacture of the branched polysiloxane of claim 1, where $3 \leq y \leq 150$.

11. A method for the manufacture of the branched polysiloxane of claim 1, where ratio of (y+z+w) to x is within a range of 0.3 to 2.

12. A method for the manufacture of the branched polysiloxane of claim 1, where each R$^4$ and R$^5$ is independently selected from a group consisting of methyl, vinyl, and phenyl.

13. A method for the manufacture of the branched polysiloxane of claim 1, where Q is chlorine; $1 \leq a \leq 500$; $4 \leq x \leq 150$; $3 \leq y \leq 150$; ratio of (y+z+w) to x is within a range of 0.3 to 2; and the method is run at a temperature within a range from −25° C. to 160° C.

14. A method for the manufacture of the branched polysiloxane of claim 13, where M is lithium.

15. A method for the manufacture of the branched polysiloxane of claim 13, where M is a hydrogen atom and the method is conducted in the presence of a hydrogen halide trapping agent.

* * * * *